(12) United States Patent
Hurlbutt

(10) Patent No.: US 6,390,567 B1
(45) Date of Patent: May 21, 2002

(54) HOUSING FOR A BRAKE BOOSTER

(75) Inventor: Ryan Michael Hurlbutt, Niles, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/933,451

(22) Filed: Aug. 20, 2001

(51) Int. Cl.$^7$ ................................................. B60T 8/44
(52) U.S. Cl. ........................ 303/114.1; 29/516; 92/128
(58) Field of Search .......................... 303/114.1, 114.2, 303/114.3, 115.1, 115.2, 115.3, 115.4; 29/437, 450, 451, 510, 511, 516; 92/63, 128, 169.1

(56) References Cited

U.S. PATENT DOCUMENTS

| | | | | |
|---|---|---|---|---|
| 3,083,698 A | * | 4/1963 | Price et al. | 121/48 |
| 3,158,930 A | * | 12/1964 | Wesstrom et al. | 29/510 |
| 4,366,612 A | * | 1/1983 | Dorsett et al. | 29/454 |
| 4,596,178 A | * | 6/1986 | Sugiura | 92/48 |
| 4,747,336 A | * | 5/1988 | Uyama | 91/376 R |
| 5,074,024 A | * | 12/1991 | Gautier | 29/451 |
| 5,297,471 A | * | 3/1994 | Boehm et al. | 92/98 R |
| 6,223,647 B1 | * | 5/2001 | Plantan et al. | 92/63 |

* cited by examiner

Primary Examiner—Pam Rodriguez
(74) Attorney, Agent, or Firm—Leo H. McCormick Jr; Warren Comstock

(57) ABSTRACT

A housing for a brake booster (100) having a first shell (10) joined to a second shell (30) by deforming a first peripheral surface on a flange (24) of the first shell (10) with respect to a second peripheral surface, (204) on the second shell (30) toward an axial center of the second shell (30). The deformation axially compresses a bead (26) on a diaphragm (28) located between the first (10) and second (30) shells to seal an interior of the housing from the surrounding environment. The housing is characterized by the first peripheral surface having a flange (24) that extends from a shoulder (18) to an opened end (16) thereof that receives the second shell (30). The flange (24) has a plurality of slits (36,36', . . . 36") that axially extend from the opened end (16) toward the shoulder (18) and a plurality of slots (38,38', . . . 38") located in a radial plane perpendicular to the opened end (16). The plurality of slots (38,38', . . . 38") are sequentially spaced in the flange (24) with respect to the plurality of slits (36,36', . . . 36") and the deformation of the first peripheral surface substantially occurs in the flange (24) at mid-points (50) between the plurality of slits (36,36', . . . 36") and adjacent mid-points of the plurality of slots (38,38', . . . 38") such that the opened end (16) remains in a substantially circular shape.

10 Claims, 3 Drawing Sheets

HOUSING FOR A BRAKE BOOSTER

BACKGROUND OF THE INVENTION

U.S. Pat. No. 3,083,698 and 3,158,930 disclose brake boosters having a housing manufactured in a well known method wherein an end surface on a first shell is crimped by cutting or shearing tabs that engage a surface on a second shell to define a unitary structure. Such crimped joints function in an adequate manner to seal the interior of the unitary structure for use as a housing for a brake booster. When used for a brake booster it was a common practice to spray paint the exterior surface of the shells to protect against oxidation of the shells that are exposed to the environment when installed in a vehicle. Unfortunately, the painting process while effective often did not provided a uniform protection over the entire exterior surface of a shell and as a result some oxidation could occur after a period of time. In an effort to better protect the shells, a process known as e-coating was developed which uniformly coats the shell and this process is now an accepted standard for protection with respect to oxidation. However, in the crimping process of joining the first shell to the second shell certain portions of the first shell are either sheared or stretched such that the sheared portion of the first shell has bare metal exposed to the environment and over a period of time this bare metal oxidizes and creates an undesirable appearance for the brake booster. While it would be possible to re-coat or touch up the bare or exposed metal after crimping, the time, effort and labor involved would add considerable cost to the manufacturing process which a customer would be hesitant to absorb as no tangible functional benefit of the brake booster would occur from such added effort.

SUMMARY OF THE INVENTION

A primary object of the present invention is to provide a housing for a brake booster wherein the entire external surface has a coating that remains after a crimping or deformation process used to join a first shell to a second shell to define a sealed unitary structure.

According to this invention, a housing for a brake booster is manufactured by deforming a first peripheral surface on a coated first shell around a second peripheral surface on a coated second shell toward an axial center of the second shell. The deformation axially compresses a bead on a diaphragm located between the first and second shells to seal an interior of the housing from the surrounding environment. The first shell is characterized by a cylindrical body with a closed end and an opened end. The cylindrical body has a first peripheral surface with a flange that extends from a shoulder to an opened end. The flange has a plurality of slits axially that extend from the opened end toward the shoulder to define a plurality of spans adjacent the opened end. A plurality of slots are located in flange in a radial plane perpendicular to the opened end and sequentially adjacent a mid-point of the plurality of spans. Each of the slots has a first and second semi-circular relief that extends into a span and toward the opened end of the first shell. A deformation of the first peripheral surface occurs by either rolling the spans into engagement with the second peripheral surface to position the second peripheral surface with respect to the shoulder such that the second peripheral surface is aligned in the plurality of slots or a first force is applied to compress the second shell toward the first shell such that the second peripheral surface is aligned in the plurality of slots and a second force is applied at each a mid-point between the first and second semi-circular reliefs to dent the span into engagement with the second peripheral surface and retain the compressive force on the bead to join the first shell with the second shell such that the flange retains a circular shape without any un-coated peripheral areas exposed to the environment.

An advantage of this invention resides in a method of joining a first shell to a second shell without the exposure of any un-coated surfaces which could oxidize over a period of time in an oxygen rich environment.

A still further advantage of this invention resides in a unitary structure wherein a first shell has a flange with a plurality of slits and slots define a controlled plane whereby deformation is achieved to retain a second peripheral surface in a fixed relationship with a first peripheral surface to create a sealed housing.

Another advantage this invention resides in a visual inspection of a connection between a first shell and a second shell to assure that a sealed relationship is achieved.

A still further advantage of the present invention resides in a method of manufacturing a housing for a brake booster wherein deformation of a flange occurs without exposing bare metal to the environment.

DETAILED DESCRIPTION

Figure 1:
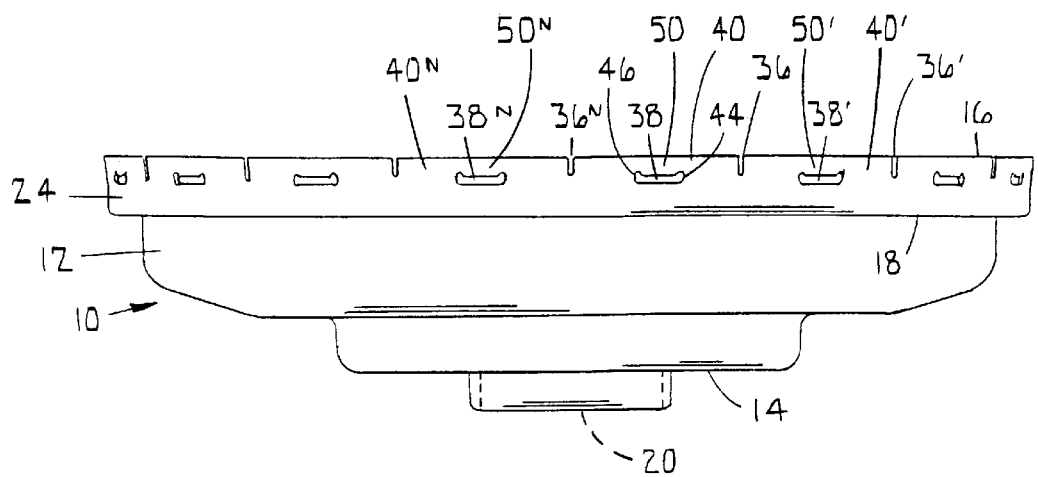
FIG. 1 is a schematic illustration of a first shell for a brake booster made according to the principals of the present invention.
Figures 6, 9:
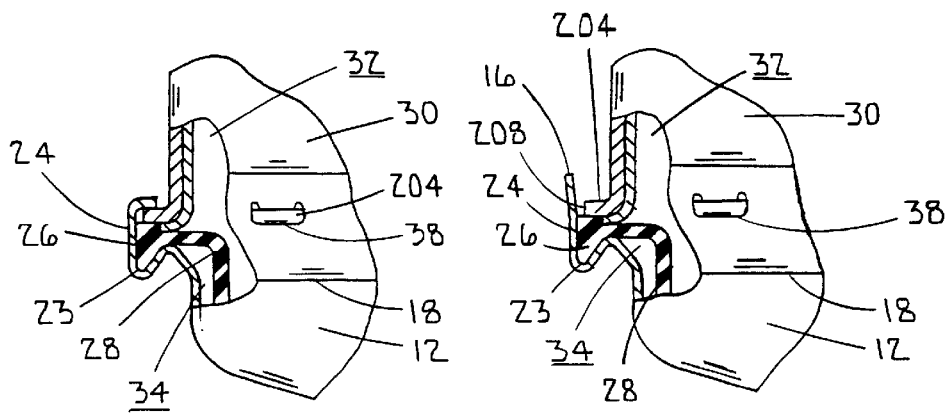
FIG. 6 is a sectional view taken along line 6—6 of FIG. 5.
FIG. 9 is a sectional view through line 9—9 of FIG. 8.

The first shell 10 illustrated in FIG. 1 is stamped out of a roll stock to define a cylindrical body 12 with a closed end 14 and an opened end 16 with a shoulder 18 located adjacent the opened end 16. The closed end 14 has an axial opening 20 for receiving a valve and a plurality of openings for receiving studs 22,22', shown in FIG. 4, to mount a resulting booster 100 on a wall of vehicle. That portion of the cylindrical body 12 between shoulder 18 and the opened end 16 of shell 10 defines a flange 24. Flange 24, as best shown in FIG. 6, has a groove 23 for receiving a bead 26 of a diaphragm 28 and an opened end 204 on a second shell 30. The first shell 10 on being joined to the second shell 30 creates a unitary structure with sealed chambers 32 and 34 therein for a resulting brake booster 100.

Figure 2:
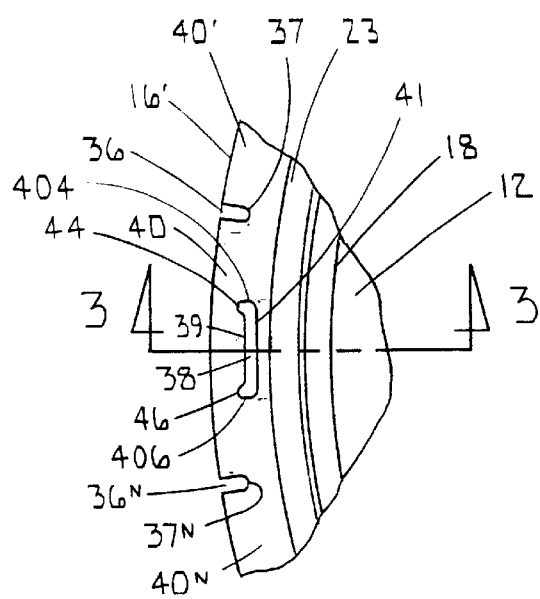
FIG. 2 is a view of a section of the flange of the first shell of FIG. 1 illustrating a slot and slit stamping process.
Figure 3:
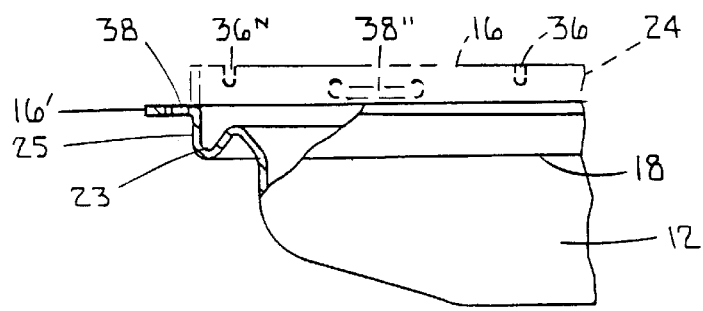
FIG. 3 is a sectional view of the flange of FIG. 2 taken along lines 3—3.

The particular details of flange 24 are illustrated in FIGS. 1,2,3,5 and 6 has a plurality of slits 36,36', . . . 36" that axially extend from the opened end 16 of shell 10 toward shoulder 18 and a plurality of slots 38,38', . . . 38" that are located in a radial plane from the axis of shell 10 and perpendicular to the opened end 16. The plurality of slots 38,38', . . . 38" are cut or punched into a flat disc of material as illustrated in FIG. 2 by a press die. It should be pointed out that each slot of the plurality of slots 38,38', . . . 38" is in a perpendicular plane or relationship with the circular peripheral surface 16' and that each slit of the plurality of slits 36,36', . . . 36" is in a radial alignment with the axial center of the shell 10. After the punching or shearing of the plurality of slits 36,36', . . . 36" and plurality of slots 38,38', . . . 38" on the circular peripheral surface 16', a force is applied to roll circular peripheral surface 16' 90 degrees to create flange 24 adjacent the opened end 16 of the resulting shell 10 as shown in FIG. 3 in dashed lines.

Figure 5:
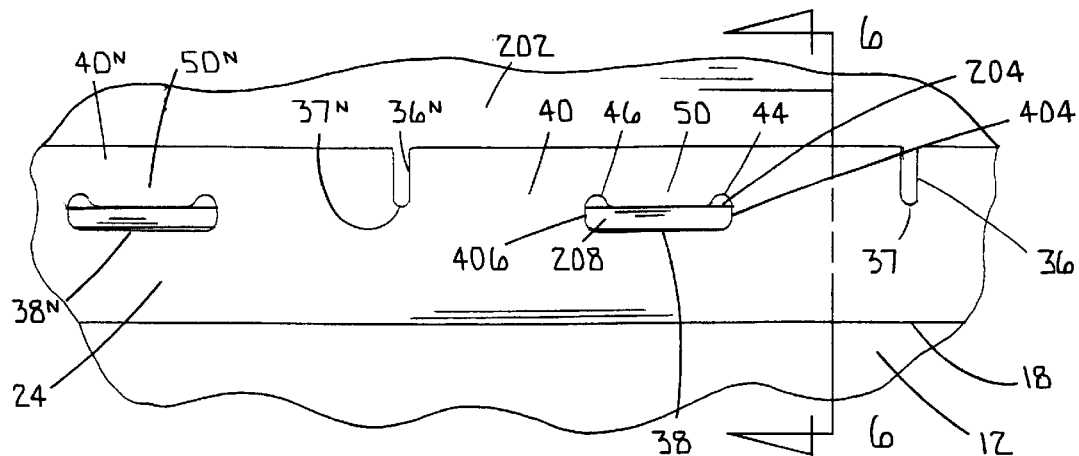
FIG. 5 is an enlarged view showing a portion of the first and second shells prior to deformation of the flange.

The plurality of slots 38,38', . . . 38" are sequentially spaced in the flange 24 with respect to the plurality of slits 36,36', . . . 36". The details of each slot of the plurality of slots 38,38', . . . 38" is best illustrated in FIG. 5 and has an inside edge 41, an outside edge 39, a first end edge 404 and a second end edge 406. After bending the inside edge 41 and outside edge 39 remain substantially as punched or sheared as illustrated in FIG. 2, however, because material is stretched and compressed as a result of the 90 degree bend of the circular peripheral surface 16' into alignment with that portion 25 of flange 24 adjacent to shoulder 18. The displaced material causes the interior surface of edge 404 and 406 of each slot to be slightly larger than the exterior surface opening of each slot in the resulting flange 24 of the shell 10. This difference in opening lengths between the interior and exterior of a slot is a tell tale indication of the stamping process and may aid in maintaining the circular shape of the opened end 16 when spans 40,40', . . . 40" are deformed to join shell 10 to shell 30.

The plurality of slots 38,38', . . . 38" are located in flange 24 in sequentially spacing with respect to the plurality of slits 36,36', . . . 36" such that a corresponding apex 37 of each of the plurality of slits 36,36', . . . 36" extends to a radial plane aligned with an outside face 39 of each slot of the plurality of slots 38,38', . . . 38" to define a plurality of spans 40,40',40". The length of each of the plurality of slots 38,38', . . . 38" is uniform and selected to be greater than a length of each of slits 36,36', . . . 36" such that a span length offers sufficient resistance to bending and yet deformation can occur at corresponding mid-points 50 while a circular shape is maintained with the opened end 16 to aid in creating a sealed structure.

Each slot of the plurality of slots 38,38', . . . 38" is further defined by first 44 and second 46 semi-circular reliefs that extend from the outside face 39 toward the opened end 16, see FIG. 5. Removal of the material from flange 24 to produce the first 44 and second 46 semi-circular reliefs allows the remaining material between the apex 37 of each of plurality of slits 36,36', . . . 36" and the first 44 and second 46 semi-circular reliefs to provide more resistance to bending than the material between a mid-point 50 of the outside face 39 of a slot 38 and the first 44 and second 46 semi-circular reliefs and a span of the plurality of spans 40,40', . . . 40".

Method of Assembly

The manufacture of a brake booster 100 having a housing with a first shell 10 joined to a second shell 30 in accordance with the principals of the present invention can be achieved through the following steps in an assembly process.

A first shell 10 is selected from a supply source. The first shell 10 having been stamped and its entire external surface coated with an oxidization protecting coating. The first shell 10 is characterized by a cylindrical body 12 with a closed end 14 and an opened end 16. A shoulder 18 adjacent the opened end 16 define a flange 24. The flange 24 has a plurality of slits 36,36', . . . 36" that axially extend from the opened end 16 toward shoulder 18 to define a plurality of spans 40,40', . . . 40" adjacent opened end 16. A plurality of slots 38,38', . . . 38" are located in flange 24 in a radial plane to the axis of the first shell 10. Slots 38,38', . . . 38" are perpendicular to the opened end 16 and sequentially adjacent a mid point 50 of each span of the plurality of spans 40,40', . . . 40". The plurality of slots 38,38', . . . 38" being further characterized by first 44 and second 46 semi-circular relief sections that extend toward the open end 16.

A second shell 30 is selected from a supply. The second shell 30 having been stamped to define a cylindrical body 202 with an opened end 204 and a closed end 206. The cylindrical body 202 has a peripheral surface 208 adjacent the opened end 204 that is located in a radial plane to the axis of the second shell 30. After the second shell 30 is stamped, its entire external surface coated with an oxidation protection coating.

Figure 4:
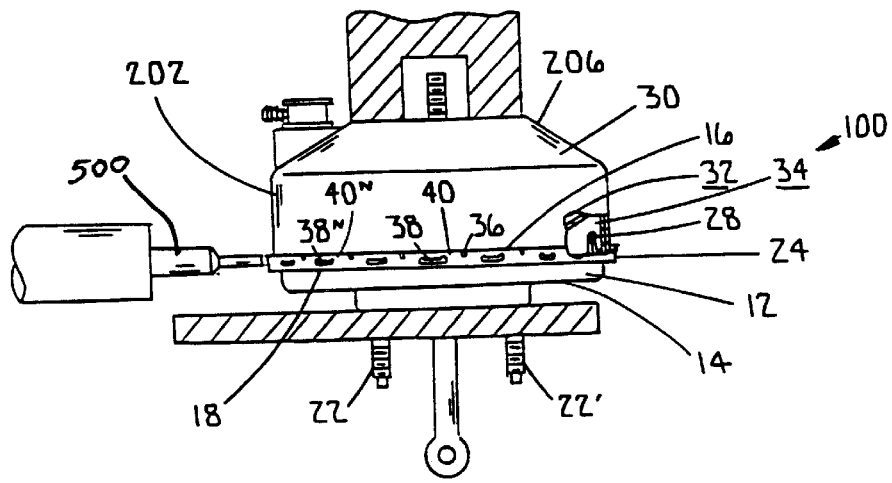
FIG. 4 is a schematic illustration showing a relationship between the first shell of FIG. 1 and a second shell during the assembly of a brake booster.

The first shell 10 is located in a fixture of a type illustrated in FIG. 4 with valve components and movable wall of a brake booster already assembled therein and a bead 26 of a diaphragm 28 located in groove 23 on flange 24 adjacent shoulder 18 to define a chamber 34 within the first shell 10.

Thereafter, the second shell 30 is placed on top of the first shell 10 such that opened end 204 engages bead 26 and is received into flange 24, as shown in FIGS. 5 and 6.

A first force is applied to the second shell 30 which moves the second shell 30 toward the first shell 10 to compress bead 26 between opened end 204 and shoulder 18. This force is applied to compress bead 26 until the peripheral surface 208 is visible in the plurality of slots 38,38', . . . 38", as illustrated in FIG. 5.

Figure 7:
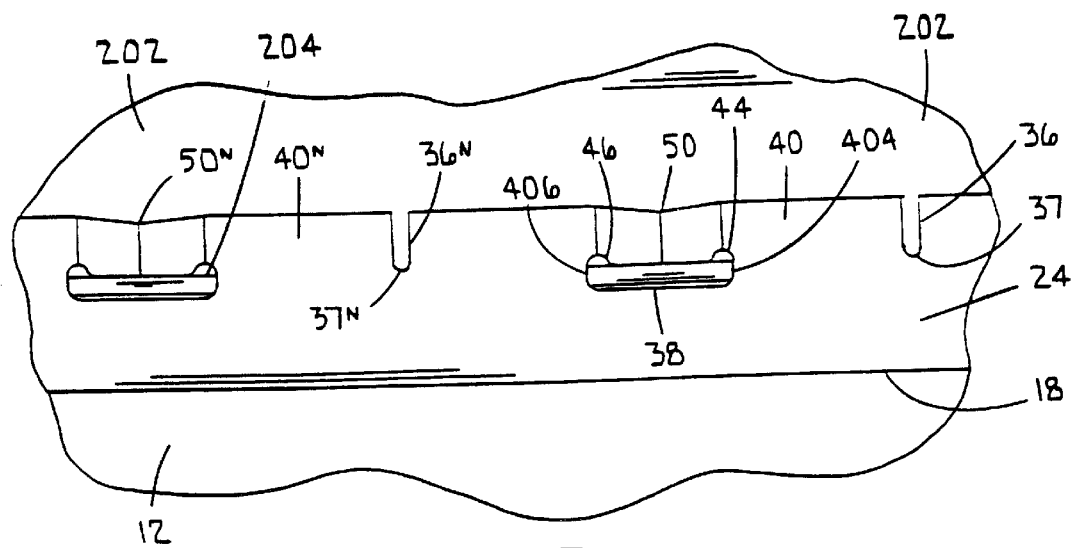
FIG. 7 is an enlarged view of a portion of a joint created between the first shell and second shell by deforming or denting the flange of the first shell into engagement with the second shell to form a unitary structure.

A second force, illustrated as a single hydraulic ram 500 for simplicity, is radially applied at a mid-point 50 of each of the plurality of spans 40,40', . . . 40" to deform the mid-point of each span of the plurality of spans 40,40', . . . 40" into engagement with the opened end 204 such that a second chamber 32 is created between the diaphragm 28 and second shell 30 while sealing both the first 32 and second chambers 34 from the surrounding environment by fixing the first shell 10 to the second shell 30 as shown in FIG. 7 to complete the manufacture of a resulting brake booster 100.

In denting or deforming the spans 40,40', . . . 40" by applying a radial force at the mid-point 50 of each span, the deformation substantially occurs in the flange 24 between the first 44 and second 46 semi-circular relief sections as the material in the flange 24 there between offers less resistance to bending and as a result the open end 16 retains a substantially circular shape with the coating remaining in tact on the peripheral surface that is exposed the environment.

Figure 8:
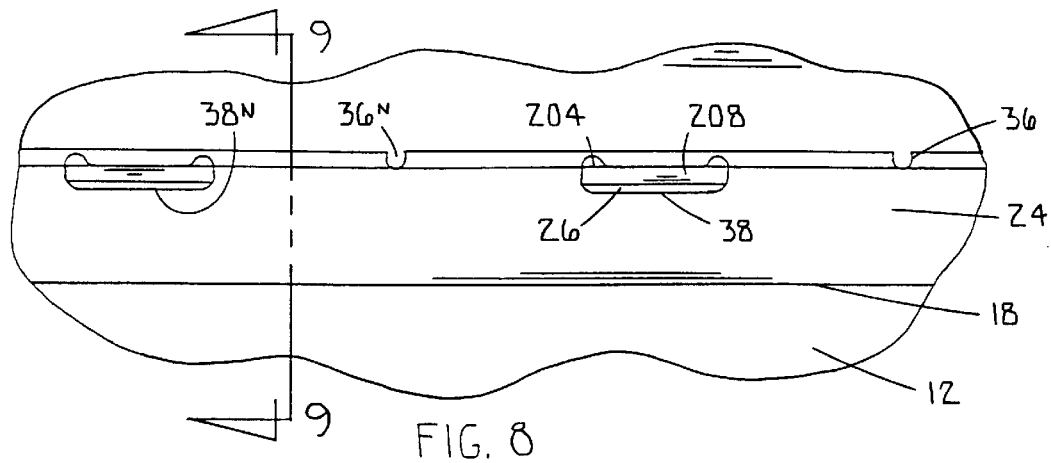
FIG. 8 is an enlarged view of a portion of a joint created between the first shell and second by rolling the flange on the first shell into engagement with the second shell to form a unitary structure.

In some instances, it may be desirable to deform the spans 40,40', . . . 40", shown in FIG. 5, by rolling rather than denting. In such instances, that portion of material between the first 44 and second 46 semi-circular relief sections and apex 37 of each of the slits of the plurality of slits 36,36', . . . 36" is bent inwardly toward the axis of shell 10 as shown in FIGS. 8 and 9. The flange 24 in the area of slots 38,38', . . . 38" offers no resistance to bending and the peripheral surface 208 on opened end 204 remains visible in the plurality of slots 38,38', . . . 38". By maintaining a length of the flange 24 between the apex 37 and first 44 and second 46 semi-circular relief sections to a distance that is substantially equal to or less than the length of an individual slot of the plurality of slots 38,38', . . . 38", and the opened end 16 retains a substantially circular shape when the first shell 10 is joined to the second shell 30 to define a unitary structure for use as a housing for a brake booster.

I claim:

1. A housing for a brake booster having a first shell joined to a second shell by deforming a first peripheral surface on the first shell with respect to a second peripheral surface on the second shell toward an axial center of said second shell to axially compress a bead on a diaphragm located between the first and second shells and seal an interior of the housing from the surrounding environment, the housing being characterized by said first peripheral surface having a flange that extends from a shoulder to an opened end thereof that receives said second shell, said flange having a plurality of axial slits that axially extend from said opened end toward said shoulder to a radial plane in said first peripheral surface to define corresponding spans in said flange between said plurality of slits and a plurality of slots located adjacent said radial plane and perpendicular to said opened end, said plurality of slots being sequentially spaced in said flange adjacent a midpoint of each span of said plurality of spans, said deforming of said first peripheral surface substantially occurring in said flange at said mid-point of said spans and adjacent a mid-point of each of said plurality of slots.

2. The housing as recited in claim 1 wherein each of said plurality of slots are characterized by having a length that is greater than a length of each said plurality of slits and an interior arcuate length of each slot is less than an exterior arcuate length that is located in said radial plane.

3. The housing as recited in claim 1 wherein each of said plurality of slots is characterized by first and second semi-circular relief sections which face said opened end, said deformation in said first peripheral surface occurring in said flange in a direction toward an axis of said second shell and at each mid-point between said first and second semicircular relief sections.

4. A method of joining a first shell to a second shell to define a housing for a brake booster comprising the steps of:

selecting a first shell from a supply, said first shell having a first cylindrical body with a closed end and a first peripheral surface with a shoulder adjacent an opened end to define a flange, said flange having a plurality of slits that axially extend from said opened end toward said shoulder to a radial plane located between said opened end and said shoulder to define a plurality of spans adjacent said opened end and a plurality of slots located in said flange in said radial plane and perpendicular to said opened end and sequentially adjacent a mid point of said plurality of spans, selecting a second shell from a supply, said second shell having a cylindrical body with a second peripheral surface;

locating a bead of a diaphragm adjacent said shoulder to define a chamber within said first shell;

inserting said second shell into said first shell such that said second peripheral surface engages said flange;

moving said second shell toward said first shell to compress said bead between said second peripheral surface and said shoulder until said second peripheral surface is visible in said plurality of slots; and applying an axial force at said mid-point of said plurality of spans to deform said spans into engagement with said second peripheral surface such that said chamber is sealed from the surrounding environment and the first shell is fixed to said second shell.

5. The method as recited in claim 4 wherein said first shell is further characterized by each of said plurality of slots having first and second semi-circular relief sections that extend toward said open end and said step of applying axial force to deform said spans occurs between said mid-point and said first and second semi-circular relief sections such that said open end retains a substantially circular shape.

6. The method as recited in claim 4 wherein said first shell is further characterized by each of said plurality of slots having first and second semi-circular relief sections that extend toward said open end and said step of applying axial force to deform said spans occurs between said first and second semi-circular relief sections such that said open end retains a substantially circular shape.

7. The method as recited in claim 4 wherein each slot of said plurality of slots is characterized by having an internal arcuate length that is less than an external arcuate length and a substantially parallel side wall with said opened end.

8. A housing for a brake booster having a first shell joined to a second shell by deforming a first peripheral surface on the first shell around a second peripheral surface on the second shell toward an axial center of said second shell to axially compress a bead on a diaphragm located between the first and second shells and seal an interior of the housing from the surrounding environment, the first shell is characterized by said first peripheral surface having a flange that extends from a shoulder to an opened end thereof, said flange having a plurality of slits axially extending from said opened end toward said shoulder to define a plurality of spans adjacent said opened end and a plurality of slots located in said flange in a radial plane perpendicular to said opened end and sequentially adjacent a mid point of said plurality of spans, said deforming of said first peripheral surface occurring by rolling said spans into engagement with said second peripheral surface to position said second peripheral surface with respect to said shoulder such that said second peripheral surface is visible in said plurality of slots and wherein each of said plurality of slots have first and second semi-circular relief sections that face said opened end, said deformation in said first peripheral surface occurring in said flange being limited to that portion of said spans located between said semi-circular relief sections and a corresponding slit of said plurality of slits such that said flange is defined by a circular shape.

9. The housing as recited in claim 8 wherein each of said plurality of slits have an apex that extends to a radial plane in which said plurality of slots are located and to which said second peripheral surface is positioned to compress said bead and seal said interior.

10. The housing as recited in claim 8 wherein an arcuate length of said flange between each of said first and second semi-circular relief sections and a corresponding slit of said plurality of slits is substantially equal to an arcuate length of a slot of said plurality of slots.

* * * * *